United States Patent
Leinonen et al.

(10) Patent No.: US 7,995,978 B2
(45) Date of Patent: Aug. 9, 2011

(54) CONTROLLING OPERATION OF A MEMORY DEVICE

(75) Inventors: Marko Leinonen, Haukipudas (FI); Teemu Hannula, Oulu (FI)

(73) Assignee: Nokia Corporation, Espoo (FI)

( * ) Notice: Subject to any disclaimer, the term of this patent is extended or adjusted under 35 U.S.C. 154(b) by 1046 days.

(21) Appl. No.: 11/666,419

(22) PCT Filed: Oct. 27, 2004

(86) PCT No.: PCT/FI2004/000636
§ 371 (c)(1),
(2), (4) Date: Jul. 27, 2007

(87) PCT Pub. No.: WO2006/045877
PCT Pub. Date: May 4, 2006

(65) Prior Publication Data
US 2008/0043361 A1 Feb. 21, 2008

(51) Int. Cl.
*H04B 1/18* (2006.01)
(52) U.S. Cl. ............... 455/186.1; 455/185.1; 455/514; 455/550.1
(58) Field of Classification Search .............. 455/407, 455/412.1, 414.1, 182.1, 183.2, 184.1, 185.1, 455/186.1, 187.1, 67.11, 67.7, 514, 550.1
See application file for complete search history.

(56) References Cited

U.S. PATENT DOCUMENTS

| 5,838,235 A | 11/1998 | Thorigne |
| 5,845,195 A * | 12/1998 | Miodownik et al. ......... 455/41.3 |
| 5,991,700 A | 11/1999 | Clay et al. |
| 6,023,390 A | 2/2000 | Kang |
| 7,274,918 B1 * | 9/2007 | Albicker .................... 455/184.1 |
| 2002/0176711 A1 | 11/2002 | Shizukuishi |
| 2003/0094526 A1 | 5/2003 | Iino |
| 2005/0266803 A1 * | 12/2005 | Dinur et al. ............... 455/67.11 |
| 2006/0168264 A1 * | 7/2006 | Baba et al. ..................... 709/230 |

FOREIGN PATENT DOCUMENTS

| CN | 1387195 A | 12/2002 |
| EP | 0 978 796 | 2/2000 |
| JP | 2003233968 | 5/2005 |
| KR | 100176570 B1 | 11/1998 |

OTHER PUBLICATIONS

Korean Office Action for application No. 10-2007-7011727 dated Nov. 30, 2010.
Official Communication issued in the corresponding Chinese Patent Application No. 200480044301.9, mailed Aug. 28, 2009.
European Office Action, European Patent Application No. 04 791 427.0, Date: Jan. 19, 2011, pp. 1-5.
Office Action issued Nov. 30, 2010 for corresponding Korean Patent Application No. 10-2007-7011727.

* cited by examiner

*Primary Examiner* — CongVan Tran
(74) *Attorney, Agent, or Firm* — Squire, Sanders & Dempsey (US) LLP

(57) ABSTRACT

A method provides controlling operation of a memory device. The method includes receiving activity information relating to at least one electromagnetic field external to the memory device. The method further includes controlling storing data to and reading from the memory device based on the activity information. A memory device and a communication device are configured to execute the method.

32 Claims, 2 Drawing Sheets

CONTROLLING OPERATION OF A MEMORY DEVICE

FIELD OF THE INVENTION

The invention relates to controlling operation of a memory device, such as hard disks or other magnetic, optical or magneto-optical memory devices. The present invention also relates to communication devices capable of transmitting radio frequency signals for accessing a communication system and possessing a memory device.

BACKGROUND OF THE INVENTION

Communication devices or user terminals, such as user equipment (UE), a mobile station (MS), a cellular phone, a personal digital assistant (PDA) or a personal computer (PC), or any other equipment operable according to a suitable network protocol, such as a wireless applications protocol (WAP) or a hypertext transfer protocol (HTTP), may be used for accessing a communication system. A communication system can be seen as a facility that enables communication sessions between two or more entities such as communication devices and/or other nodes associated with the communication system. Wireless communication systems may provide mobility for users thereof. Wireless communication systems may comprise cellular systems, e.g. global system for mobile communications (GSM), general packet radio service (GPRS) and universal mobile telecommunications system (UMTS), and non-cellular systems, e.g. wireless local area network (WLAN) and Bluetooth. Transfer techniques may comprise, for example, time division multiple access (TDMA), frequency division multiple access (FDMA), code division multiple access (CDMA) and wideband CDMA (WCDMA). Wireless communication systems may establish communication sessions also with other communication systems, such as fixed line communication systems, e.g. a public switched telephone network (PSTN) or with packet switched data networks, e.g. Internet Protocol (IP) networks.

A communication device may be used for tasks such as for making and receiving phone calls, for receiving and sending data from and to the network and for experiencing multimedia content or otherwise using multimedia services. A communication device may include an antenna for wirelessly receiving and transmitting radio frequency (RF) signals from and to transceiver network elements of a communication network. A communication device may also be provided with a display, camera means, speaker means, and so on. The operation of a communication device may be controlled by means of an appropriate user interface such as control buttons, voice commands and so on. Furthermore, a communication device is provided with a processor entity and a memory means.

In a mobile communication device, such as a mobile station or user equipment, electrical memory means have typically been provided by means of semiconductor technology. Such electrical memory means are not sensitive for external magnetic fields. They can be effectively shielded from electrical interferences since they are physically small devices. A physical size of a memory circuit used in mobile phones is typically smaller than 1 cm by 1 cm, height being a couple of millimeters.

Demands for memory capacity are continuously increasing due to expanding amount and size of applications and user data transferred and stored by means of mobile communication devices. Hard disks might provide additional or larger memory capacity for storing and processing applications and data for mobile user equipment.

Hard disks, or fixed disks, typically store data in tracks in a rotating disk and use a reading and writing head(s) for handling the data. In this specification, the reading/writing head is called simply a reading head in order to simplify the terminology. However, this term may comprise both the reading and the writing operation in the hard disk. This same reading and writing principle may also be used in optical disks, e.g. a compact disk (CD), a digital versatile disk (DVD), and in magneto-optical disks, e.g. a mini disk (MD).

In communication devices, RF signals may generate strong electromagnetic fields when the RF signals propagate through transmitter or receiver chains. A reading head of a hard disk may employ a magnetic field, which is applied to a coil of the reading head. External electromagnetic fields, or RF signals, may cause problems to the reading head controlling of reading/writing data. Furthermore, external electromagnetic fields may corrupt the data between a hard disk and a mobile terminal. As a result the hard disk may not function correctly. For example, the reading head may be positioned in an incorrect track resulting in reading or writing errors.

A hard disk may be protected against external electromagnetic fields by improving a shielding surrounding the hard disk in a communication device. The shielding may, however, increase cost and weight of the user equipment. The shielding may also not guarantee that no electromagnetic waves propagate to the hard disk.

Another solution could be protecting the hard disk by minimizing sources of electromagnetic waves. This would require adequately shielding the RF signals within RF modules transmitting and receiving the RF signals. However, this may not always be possible due to interconnections on the PWB (printed wired board) and a non-perfect ground plane. Also, an electromagnetic field generated by the transmission of the radio communication signal from an antenna can harm the hard disk operation.

U.S. Pat. No. 6,023,390 describes bias force disturbance and runout disturbance compensation in an actuator of a magnetic disk drive by means of an algorithm. Bias force disturbances are caused by an elastic character of a flexible printed circuit cable connected to the actuator. Runout disturbances are caused by transversal irregularities of the disk, which may arise when the center of the disk is not precisely aligned with the spindle motor axle, or when the disk is defectively mounted.

There is a need for improved protection of hard disks and other memory devices against external electromagnetic fields. This may lead to a solution allowing or facilitating a use of various memory devices, for example hard disks, in communication devices transmitting and receiving RF signals. In particular, improved protection may be useful in mobile user equipment where size and weight of the equipment may be significant.

SUMMARY OF THE INVENTION

In accordance with an aspect of the invention, there is provided a method for controlling operation of a memory in a device. The method comprises receiving activity information relating to at least one electromagnetic field external to the memory. The method also comprises controlling storing data to and reading data from the memory device based on the activity information.

In accordance with a further aspect of the invention, there is provided a memory configured to operate in a communication device relating to an electromagnetic field external to the memory device, wherein storing data to and reading data from the memory device is controlled based on activity information relating to the external electromagnetic field.

In accordance with a further aspect of the invention, there is provided a communication device comprising a memory, the communication device relating to an electromagnetic field external to the memory device, storing data to and reading data from the memory device configured to be controlled based on activity information relating to the external electromagnetic field.

The memory device may be a magnetic memory device, an optical memory device or a magneto-optical memory device. Examples of such memory devices may comprise a hard disk, a compact disk, a digital versatile disk, a minidisk, a subscriber identity module and a multimedia memory card.

Various embodiments and variations of the invention shall become clear from the following detailed description and the attached claims.

BRIEF DESCRIPTION OF THE DRAWINGS

The invention will now be described in further detail, by way of example only, with reference to the following examples and accompanying drawings, in which.

DETAILED DESCRIPTION OF PREFERRED EMBODIMENTS

The present invention proposes placing a hard disk or another magnetic, optical or magneto-optical memory device in a communication device relating to external electromagnetic fields, which are external of said memory device, such as electromagnetic fields created by RF signals. For minimizing the effects of RF signals, embodiments are proposed taking into account the external electromagnetic fields when they are present.

In an embodiment, operation of a reading head of the memory device may be stopped when the external electromagnetic fields are present, for example when the communication device transmits or receives RF signals.

In an embodiment, compensation for an external electromagnetic field can be done with a counter force, which is applied to reading head positioning control.

In an embodiment, changing control values of a reading head positioning system can do the compensation. A further internal magnetic field may be created to compensate the external magnetic field in the memory device.

In an embodiment, a reading head of a hard disk may be driven to a known safe position, such as to a parking area. A parking area is used when hard disk operational voltage is shut down or the hard disk is not rotating. Parking is done in order to prevent the reading head to touch the disk. If the reading head touches the hard disk surface, this area of the hard disk may be physically damaged and may not work any more.

Figure 1:
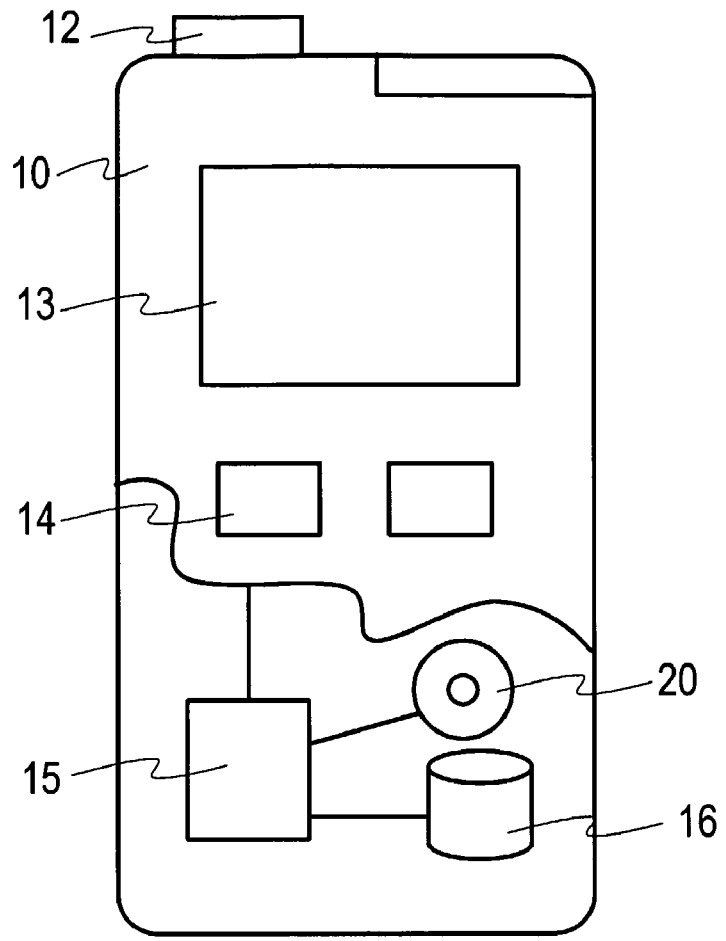
FIG. 1 shows an example of a communication device in which the embodiments of the invention may be implemented.

FIG. 1 shows an example of a communication device 10 comprising an antenna 12 for radio reception and transmission. The communication device 10 is provided with a display 13 and control buttons 14. Furthermore, a processor entity 15, electrical memory means 16 and a hard disk 20 are provided.

FIG. 1 shows only one exemplifying communication device in which the embodiments of the invention may be implemented. The communication device of FIG. 1 has a form of a mobile station. It shall be appreciated that the type of the communication device may differ substantially from what is shown in FIG. 1. The radio reception and transmission means may as well be built in the casing of the communication device or arranged in another appropriate manner. The control buttons of any appropriate form may be positioned in an appropriate manner depending on the communication device type, size and use, for example.

Other communication devices or user terminals where embodiments of the invention may be implemented may comprise, but are not limited to, for example devices described above in the background section and any other communication devices or user terminals comprising a source of RF signals together with a hard disk or another memory device which may be affected by the external electromagnetic fields. Embodiments of the invention may be implemented together with, for example, a magnetic memory device, an optical memory device, and a magneto-optical memory device. In addition to a hard disk, examples of memory devices may comprise a compact disk (CD), a digital versatile disk (DVD), a minidisk (MD), a subscriber identity module (SIM), a multimedia memory card (MMC) and so on.

Electromagnetic fields may be created by cellular or non-cellular activity. Examples of cellular systems creating electromagnetic fields may comprise, but are not limited to, wireless mobile communication systems, e.g. GSM, GPRS or UMTS. Examples of non-cellular wireless systems creating electromagnetic fields may comprise, but are not limited to, Bluetooth, WLAN, global positioning system (GPS) and so on.

Figure 2:
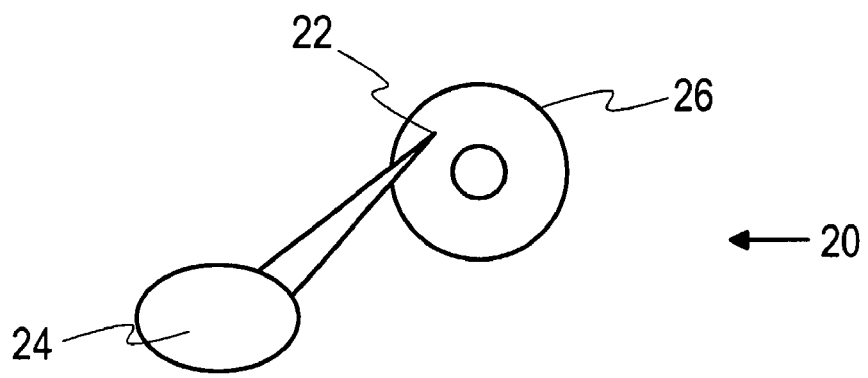
FIG. 2 shows an example of a hard disk structure.

FIG. 2 shows an example of a hard disk 20 structure. A reading head 22 is steered by inducting a magnetic field to a magnetic coil of a control mechanism 24. The magnetic coil of the control mechanism 24 moves the reading head 22 to a wanted position on a rotating disk 26. The reading head 22 consists of a small coil, which changes polarization of a magnetic material at a surface of the rotating disk 26. The external electromagnetic fields may induce magnetic field either to the magnetic coil of the control mechanism 24 or to the reading head 22. In an embodiment, an electrical interference field may be conducted to head location control electronics, which drives the control mechanism 24. In an embodiment, data to be written or read by the reading head 22 may be interrupted.

FIG. 2 presents a hard disk having reading head positioning control based on a voice coil. In this method, the coil generates a magnetic field, which drives the reading head to a wanted location. The reading head location is related to the strength of the magnetic field.

The reading head positioning can be done also in other ways. An exemplifying embodiment may comprise using a step motor. In this embodiment, the location of the reading head is related to control of the step motor. Such other control systems may also be vulnerable for the external electromagnetic fields. Embodiments of the invention may thus provide advantages also in respect of other control systems.

Figure 3:
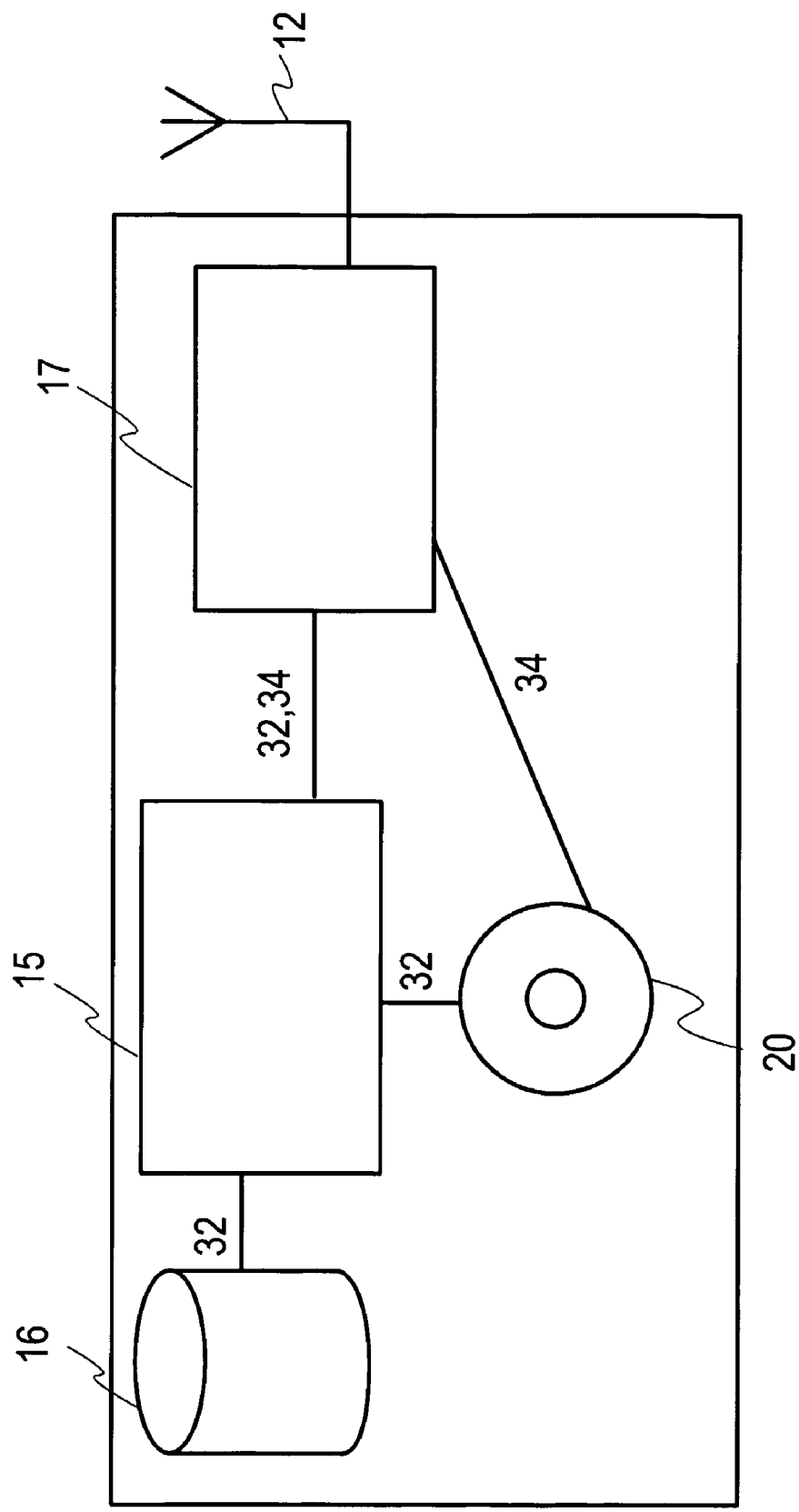
FIG. 3 shows a schematic diagram of an embodiment of the invention.

In an embodiment illustrated in FIG. 3, data signals 32 may be routed to the processor entity 15 collecting relevant information in the memory means 16. The processor entity 15 may control an access to the hard disk 20. The processor entity 15 receives knowledge of when an RF module 17 connected to the antenna 12 or other transmission and reception means is active or transmitting above a predetermined power level. The processor entity 15 may receive the knowledge by means of base band signals 34. The base band signals may include, but are not limited to, transmission ON/OFF indicating whether the transmission is underway, transmission power level, transmission timing and transmission frequency. When the RF module 17 is active, data transmitted in data signals 32 may be stored in the memory means 16. At a suitable moment when the RF module is not active or external electromagnetic fields are below a predetermined power level, the data is transferred by the processor entity 15 from the memory means 16 to the hard disk 20. In an embodiment, base band signals 34 from the RF module can be routed directly to the hard disk 20. The hard disk 20 may use these RF state indication signals as an input for the compensation or for control purposes. The RF control and state information can be transmitted also as a data signal format to the hard disk.

In time synchronized systems, such as the GSM, the user equipment may determine easily when the RF module in the user equipment is active, i.e. transmitting or receiving RF signals. RF transmission may be multiplexed with reading and writing activity of the hard disk, for example, by preventing the reading and writing operations to the hard disk when the RF module is active or the transmission is done above a pre-determined power level. Preventing can be done by storing data temporarily to the memory means, as illustrated in FIG. 3. In an embodiment, preventing can be done simply by stopping reading and writing operations when the RF module is active.

In non-pulsed systems, such as wideband code division multiple access (WCDMA) systems, data packets are transmitted and received in a non-pulsed manner and the transmission may be continuous. In an embodiment, the reading and writing operation may be calibrated to take into account a continuous output RF signal. A first set of force values caused by a magnetic field may be applied for positioning the reading and writing head when the RF module is not active and thus no additional electromagnetic fields external of the hard disk are produced. When the RF module becomes active, a second set of force values may be applied to compensate an interference caused by the RF signals. The second set of force values seeks keeping the reading head in a correct location in the tracks of the hard disk.

The second set of force values may be determined by calibration to form a look-up table. The calibration may be performed, for example, during manufacture of the communication device. The effect of transmission of the own RF module of the device to reading and writing operation of the hard disk may be studied during the manufacture. The transmission power level is varied and reading and writing operation is carried out. The actual reading head position is stored to the look-up table, which may comprise transmission power level information and a further internal magnetic field value, i.e. the second set force value, needed to be applied to the magnetic coil in order to keep the reading head in the correct location. In an embodiment, a communication device may be provided with a look-up table later, for example by configuring relevant software of the communication device.

In an embodiment, the communication device may inform the hard disk of transmission on/off, transmission power level, transmission timing or transmission frequency. If a reading or writing operation is carried out during the transmission and the operation fails, the communication device may request a new reading or writing operation to be performed.

As an example, when GSM transmission is done in a voice call, transmission burst may occur 4 ms (millisecond) apart of each other. In a GSM 900 system, maximum transmission power is 2 W (watt) equal to +33 dBm (decibel compared to milliwatt). In the GSM, mobile transmission power level of the mobile phone varies depending on the received signal strength. The transmission power can vary more than 30 dB. On the other hand, in the WCDMA systems, transmission may be always on, but the transmission level may change 1600 times in a second. Maximum transmission level in the WCDMA systems may be 125 mW equal to +21 dBm. In these exemplifying cases, the GSM transmission may shift the hard disk reading head position rapidly a lot and the WCDMA transmission may shift the hard disk reading head position constantly. The WCDMA transmission power level can vary about 70 dB. In some cases the lowest transmission power levels do not harm hard disk operation when the higher power levels do harm.

Communication devices configured to use combined transmission systems, such as a combination of the GSM and the WCDMA, have been developed. The present invention may prove particularly advantageous in such systems.

Although the invention has been described in the context of particular embodiments, various modifications are possible without departing from the scope and spirit of the invention as defined by the appended claims. It should be appreciated that whilst embodiments of the present invention have mainly been described in relation to mobile communication devices, embodiments of the present invention may be applicable to other types of communication devices comprising a hard disk or another memory device and potentially affected by an external electromagnetic interference. Furthermore, transmission frequency, transmission timing and power level information may also be used to make removable memory card more robust to external interferences caused by own RF transmission.

The invention claimed is:

1. A method, comprising:

receiving activity information used to indicate whether at least one electromagnetic field external to a memory device is active or above a predetermined power level;

controlling storing data to and reading data from the memory device based on the activity information, wherein the controlling comprises stopping the storing to and/or the reading from the memory device when the activity information indicates that at least one external electromagnetic field is active or above a predetermined power level; and storing data temporarily in electrical memory means and transferring the data in the memory device when the activity information indicates that no external electromagnetic field is active or external electromagnetic fields are below a predetermined power level.

2. The method according to claim 1, wherein the controlling comprises controlling reading/writing head positioning of at least one of a magnetic memory device, an optical memory device, and a magneto-optical memory device.

3. The method according to claim 2, wherein the controlling comprises controlling reading/writing head positioning of at least one of a hard disk, a compact disk, a digital versatile disk, a minidisk, a subscriber identity module and a multimedia memory card.

4. The method according to claim 1, wherein the receiving the activity information comprises receiving information on transmission or reception of radio frequency signals.

5. The method according to claim 4, wherein the receiving comprises receiving the information on transmission and/or reception of radio frequency signals from and/or to transmission and receiving means of a communication device and the controlling comprises controlling reading/writing head positioning of a memory device provided in the communication device.

6. The method according to claim 4, wherein the receiving the information on transmission and/or reception of radio frequency signals comprises receiving information on whether the transmission or reception is underway, on transmission/reception power level, timing and/or frequency.

7. The method according to claim 1, wherein the controlling comprises creating a compensation for the external electromagnetic field.

8. The method according to claim 7, wherein the creating the compensation comprises creating the compensation by means of a counter force applied to reading/writing head positioning control.

9. The method according to claim 8, wherein the receiving the activity information comprises obtaining the activity information from a look-up table and the creating the compensation comprises creating the counter force by means of the look-up table.

10. The method according to claim 7, wherein the creating the compensation comprises creating the compensation by changing control values of a reading/writing head positioning system.

11. The method according to claim 10, wherein the receiving the activity information comprises obtaining the activity information from a look-up table and the creating the compensation comprises changing the control values by means of the look-up table.

12. The method according to claim 1, wherein the controlling comprises driving a reading/writing head of the memory device to a predetermined position when the activity information indicates that at least one external electromagnetic field is active or above a predetermined power level.

13. A computer program comprising program code means for performing the method according to claim 1 when the program is run on a computing means.

14. An apparatus, comprising:
a memory device configured to operate in a communication device relating to an electromagnetic field external to the memory device,
wherein the apparatus is configured to control the storing data to and reading data from the memory device based on activity information used to indicate whether at least one electromagnetic field external to the memory device is active or above a predetermined power level,
wherein the apparatus is further configured to stop the storing to and/or the reading from the memory device when the activity information indicates that at least one external electromagnetic field is active or above a predetermined power level, and
wherein the apparatus is further configured to store data temporarily in electrical memory means and transfer the data in the memory device when the activity information indicates that no external electromagnetic field is active or external electromagnetic fields are below a predetermined power level.

15. The apparatus according to claim 14, comprising a magnetic memory device, an optical memory device or a magneto-optical memory device.

16. The apparatus according to claim 15, comprising a hard disk, a compact disk, a digital versatile disk, a minidisk, a subscriber identity module or a multimedia memory card.

17. The apparatus according to claim 14, the external electromagnetic field being created by transmission and/or reception means of the communication device, capable of transmitting and/or receiving radio frequency signals.

18. The apparatus according to claim 14, the external electromagnetic field being created by cellular activity.

19. The apparatus according to claim 18, the cellular activity comprising activity of a mobile communication system.

20. The apparatus according to claim 14, the external electromagnetic field being created by non-cellular activity.

21. The apparatus according to claim 20, the non-cellular activity comprising activity of a Bluetooth system, a wireless local area network or a global positioning system.

22. The apparatus according to claim 14, wherein the apparatus is configured to allow a counter force to be created to reading/writing head control or to allow altering control values of reading/writing head positioning system to compensate the external electromagnetic field.

23. The apparatus according to claim 14, wherein the apparatus is configured to drive a reading/writing head of the memory device to a predetermined position when the activity information indicates that at least one external electromagnetic field is active or above a predetermined power level.

24. A communication device comprising an apparatus according to claim 14.

25. A communication device, comprising:
a memory device and electrical memory configured to store data temporarily, the communication device relating to an electromagnetic field external to the memory device,
wherein the communication device is configured to store data to and read data from the memory device configured to be controlled based on activity information used to indicate whether at least one electromagnetic field external to the memory device is active or above a predetermined power level,
wherein the memory device is configured to stop storing data to and reading data from the memory device when the activity information indicates that at least one external electromagnetic field is active or above a predetermined power level, and
wherein the electrical memory is further configured to transfer the data into the memory device when the activity information indicates that no external electromagnetic field is active or external electromagnetic fields are below a predetermined power level.

26. The communication device according to claim 25, wherein the memory device is a magnetic memory device, an optical memory device or a magneto-optical memory device.

27. The communication device according to claim 26, wherein the memory device is a hard disk, a compact disk, a digital versatile disk, a minidisk, a subscriber identity module or a multimedia memory card.

28. The communication device according to claim 25, wherein the activity information comprises information on transmission and/or reception of radio frequency signals.

29. The communication device according to claim 28, wherein the information on transmission and/or reception of radio frequency signals comprises information on whether the transmission or reception is underway, on transmission/reception power level, timing and/or frequency.

30. The communication device according to claim 25, further comprising means for creating a counter force to reading/writing head control or means for altering control values of reading/writing head positioning system to compensate the external electromagnetic field.

31. The communication device according to claim 30, wherein the means for creating a counter force or the means for altering the control values are controlled by means of a look-up table.

32. The communication device according to claim 25, wherein a reading/writing head of the memory device is configured to be driven to a predetermined position when the activity information indicates that at least one external electromagnetic field is active or above a predetermined power level.

* * * * *